(12) United States Patent
Yamaguchi

(10) Patent No.: US 10,354,402 B2
(45) Date of Patent: Jul. 16, 2019

(54) IMAGE PROCESSING APPARATUS AND IMAGE PROCESSING METHOD

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 15/466,314

(22) Filed: Mar. 22, 2017

(65) Prior Publication Data

US 2017/0287154 A1 Oct. 5, 2017

(30) Foreign Application Priority Data

Mar. 29, 2016 (JP) .................. 2016-066086

(51) Int. Cl.
*G06T 7/60* (2017.01)
*G06T 7/73* (2017.01)
(Continued)

(52) U.S. Cl.
CPC .............. *G06T 7/60* (2013.01); *G06K 9/4604* (2013.01); *G06T 7/251* (2017.01); *G06T 7/73* (2017.01);
(Continued)

(58) Field of Classification Search
CPC ............ G06T 7/60; G06T 7/73; G06K 9/4604
(Continued)

(56) References Cited

U.S. PATENT DOCUMENTS

2008/0292180 A1\* 11/2008 Kobayashi ............. G06K 9/209
382/154
2014/0098091 A1 4/2014 Hori

FOREIGN PATENT DOCUMENTS

JP 2008-286756 11/2008
JP 2015-118641 6/2015
(Continued)

OTHER PUBLICATIONS

Extended European Search Report dated Sep. 29, 2017 for corresponding European Patent Application No. 17161542.0, 10 pages. \*\*\*Please note US-2008/0292180-A1 and JP-2015-118641-A cited herewith, were previously cited in an IDS filed on Mar. 22, 2017\*\*\*.
Armstong, Martin et al., "Robust Object Tracking", Asian Conference on Computer Vision, Jan. 1, 1995, pp. 1-5, XP055407649.
Lima, Joao Paulo et al., "Model Based Markerless 3D Tracking applied to Augmented Reality", SBC Journal on 3D Interactive Systems, vol. 1, Jan. 1, 2010, pp. 2-15, XP055407656.
(Continued)

*Primary Examiner* — Jeffery A Williams
(74) *Attorney, Agent, or Firm* — Fujitsu Patent Center

(57) ABSTRACT

A computer estimates a first position of an image capturing apparatus by using a prescribed number of combinations that correlate projection lines to feature lines. The projection lines are obtained by projecting candidate lines included in shape information of an object onto an image. Then, the computer generates a first projection line by projecting another candidate line onto the image using the first position, and selects a feature line that corresponds to the first projection line. Subsequently, the computer estimates a second position of the image capturing apparatus by using a combination that correlates the first projection line to the selected feature line. The computer generates a second projection line by projecting the other candidate line onto the image using the second position, and determines a third position of the image capturing apparatus according to an indicator of an interval between the second projection line and the other feature line.

14 Claims, 20 Drawing Sheets

(51) Int. Cl.
*G06K 9/46* (2006.01)
*G06T 7/246* (2017.01)

(52) U.S. Cl.
CPC ...... *G06T 7/75* (2017.01); *G06T 2207/30244* (2013.01)

(58) Field of Classification Search
USPC .......................................................... 348/158
See application file for complete search history.

(56) References Cited

FOREIGN PATENT DOCUMENTS

| WO | 2012/173141 | 12/2012 |
| WO | 2014/179349 | 11/2014 |

OTHER PUBLICATIONS

Hebborn, Anna Katharina et al., "Robust Model Based Tracking Using Edge Mapping and Refinement", Augmented and Virtual Reality, Apr. 1, 2015, pp. 109-124, XP055407657.

Hirotake Ishii et al., "Proposal and Evaluation of Decommissioning Support Method of Nuclear Power Plants using Augmented Reality", Transactions of the Virtual Reality Society of Japan, vol. 13, No. 2, pp. 289-300, Jun. 2008 (15 pages), with partial English translation.

Bruce G. Baumgart, "A Polyhedron Representation for Computer Vision", Proceedings of the May 19-22, 1975, National Computer Conference and Exposition, pp. 589-596 (8 pages).

\* cited by examiner

F I G. 6 A
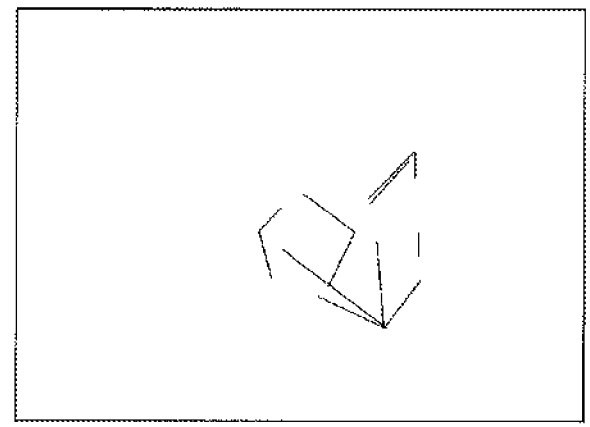
F I G. 6 B
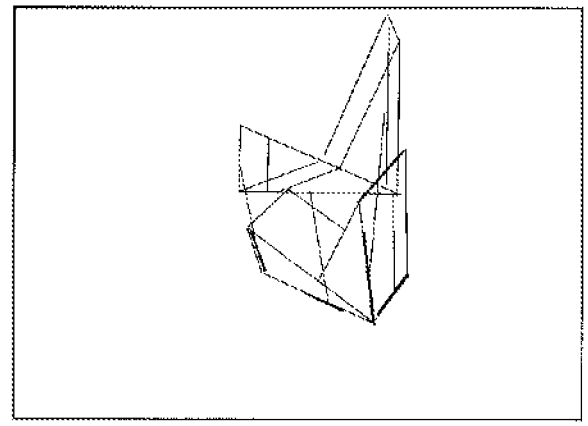
F I G. 6 C
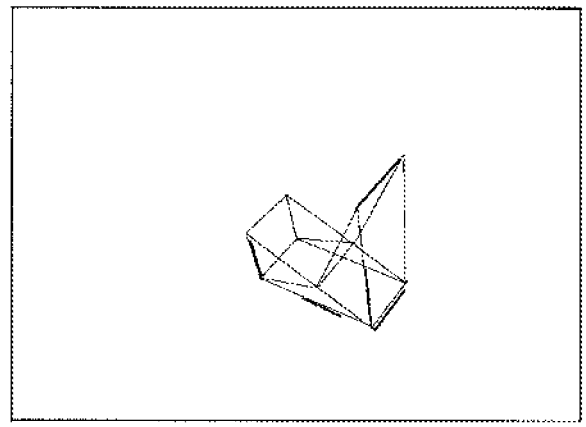

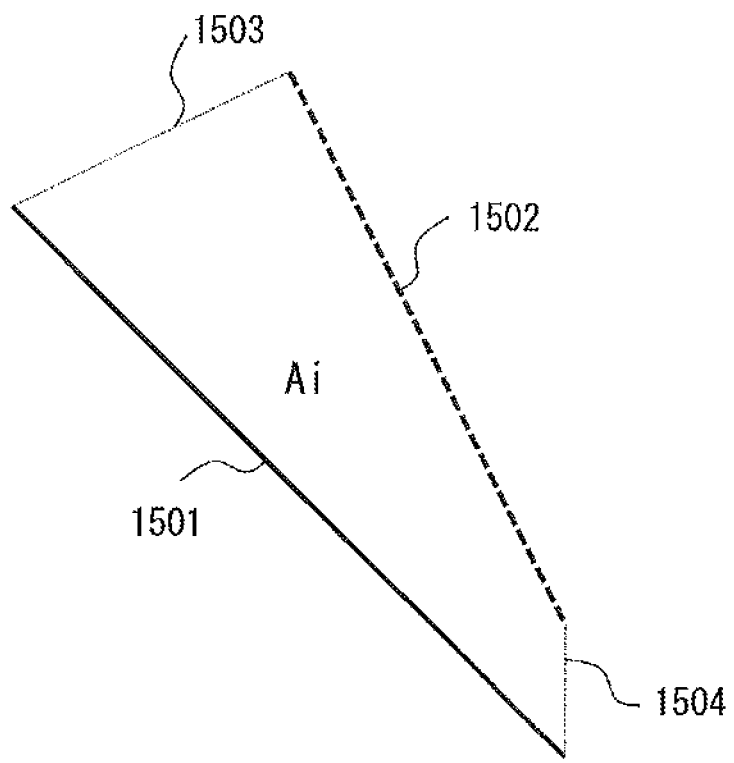
F I G. 1 5

FIG. 17

|  | 1ST | 2ND | 3RD | 4TH | 5TH | 6TH | 7TH | 8TH | 9TH | ... | R-TH |
|---|---|---|---|---|---|---|---|---|---|---|---|
| P1 | ○ | ○ | ○ | ○ | ○ | ○ | ○ | ○ | ○ |  | ○ |
| P2 | ○ | ○ | ○ | ○ | ○ |  |  |  |  |  |  |
| P3 | ○ | ○ | ○ | ○ | ○ | ○ | ○ | ○ | ○ |  | ○ |
| P4 |  |  |  | ○ | ○ | ○ | ○ | ○ | ○ |  | ○ |
| P5 | ○ | ○ |  |  |  | ○ |  |  |  |  |  |
| P6 |  |  | ○ |  |  |  | ○ |  |  |  | ○ |
| P7 |  |  |  |  | ○ |  |  | ○ | ○ |  |  |
| ∙ |  |  |  |  |  |  |  |  |  |  |  |
| E | 100 | 110 | 90 | 50 | 20 | 30 | 70 | 10 | 30 |  | 50 |

|  | F1 | F2 | F3 | F4 |
|---|---|---|---|---|

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2016-066086, filed on Mar. 29, 2016, the entire contents of which are incorporated herein by reference.

FIELD

The embodiments discussed herein are related to an image processing apparatus and an image processing method.

BACKGROUND

In recent years, systems that display images according to an Augmented Reality (AR) technique have become widespread (see, for example, patent document 1 and non-patent document 1). In an exemplary AR technique, an image of an object is captured using a camera installed in, for example, a Personal Computer (PC) or a portable terminal apparatus, and the position and posture of the camera within a three-dimensional space are estimated from the image of the object. Content information is superimposition-displayed at an arbitrary position within the image with reference to the determined camera position and posture.

FIG. 1 illustrates an exemplary AR technique for supporting a user inspection. A user 101 shoots an image of an inspection target 103 and a marker 104 using a camera installed in a portable terminal apparatus 102 such as a tablet.

The portable terminal apparatus 102 displays the captured image on a screen 105, and reads identification information indicated by the marker 104 so as to estimate a camera position and posture within a three-dimensional space. With reference to the estimated camera position and posture, the portable terminal apparatus 102 superimposition-displays content information 106 that corresponds to the marker 104 using, for example, Computer Graphics (CG). Content information 106 indicates procedures for the inspection of the inspection target 103, and the user 101 can perform the inspection efficiently by referring to content information 106.

Another method has also been proposed for determining a camera position and posture using characteristic factors (feature points) included in a captured image without providing a marker on a subject (see, for example, patent document 2). For example, a feature point may be detected from an image by using criteria for uniquely defining the position of a focused-on point within the image according to a grayscale fluctuation when the grayscale fluctuation is large at positions close to the focused-on point.

FIG. 2 illustrates an exemplary method of determining a camera position and posture using feature points. In this method, a three-dimensional map 201 is generated in advance that represents a set of three-dimensional coordinates of map points 211 on an object.

When an image 202 has been captured, the map points 211 are projected onto the image 202 using a transformation matrix M that transforms a three-dimensional coordinate system 203 into a camera coordinate system 204, thereby determining projection points 212. A camera position and posture within the three-dimensional coordinate system 203 are estimated by correlating the projection points 212 to feature points 213 detected from the image 202. For example, the camera position may be represented by the relative position of the camera coordinate system 204 relative to the three-dimensional coordinate system 203, and the camera posture may be represented by the relative angle of the camera coordinate system 204 relative to the three-dimensional coordinate system 203.

The following formulae may express Sp, the three-dimensional coordinates of a map point p; xp', the two-dimensional coordinates of a projection point that corresponds to the map point p; and xp, the two-dimensional coordinates of a feature point that corresponds to the map point p.

$$Sp = (x, y, z) \quad (1)$$

$$xp' = (u', v') \quad (2)$$

$$xp = (u, v) \quad (3)$$

In this case, the following formula expresses E, the sum of squares of the distance between a projection point and a feature point on the image.

$$E = \sum_p |xp' - xp|^2 \quad (4)$$

The camera position and posture are determined by determining a transformation matrix M that minimizes the sum of squares E in formula (4).

FIG. 3 illustrates an exemplary generation method for a three-dimensional map 201. This generation method relies on stereographic photographing and stereographic analysis. Images 301 and 302 that have been respectively shot at image-shooting positions 311 and 312 are used as key frames, and a feature point 313 within the image 301 and a feature point 314 within the image 302 are correlated to each other so as to recover a map point 315 within a three-dimensional space. Correlating a plurality of feature points within one of the two images to those within the other image recovers a plurality of map points, and a three-dimensional map 201 is generated that represents a set of the map points.

As an application of the AR technique, a technique is known for superimposition-displaying, on an image, Computer-Aided Design (CAD) data representing a three-dimensional shape of an object (see, for example, patent documents 3 and 4). CAD data may be superimposition-displayed in an image of a product produced according to the CAD data in a manner such that the CAD data overlaps the product, thereby allowing the formation accuracy of the product or defects in the product to be checked. In this case, a three-dimensional map does not need to be generated because the CAD data includes information on the three-dimensional map.

Polyhedron representation for computer vision is also known (see, for example, non-patent document 2).
Patent document 1: Japanese Laid-open Patent Publication No. 2015-118641
Patent document 2: International Publication Pamphlet No. WO2014/179349
Patent document 3: International Publication Pamphlet No. WO2012/173141
Patent document 4: Japanese Laid-open Patent Publication No. 2008-286756
Non-patent document 1: Ishii et al., "Proposal and Evaluation of Decommissioning Support Method of Nuclear Power Plants using Augmented Reality", *Transactions of the Virtual Reality Society of Japan*, 13(2), pp. 289-300, June 2008

Non-patent document 2: Bruce G. Baumgart, "A polyhedron representation for computer vision", *Proceedings of the May 19-22, 1975, national computer conference and exposition*, pp. 589-596, 1975

SUMMARY

According to an aspect of the embodiments, a non-transitory computer-readable recording medium stores an image processing program causing a computer to execute the following process.

(1) A computer estimates a first position of an image capturing apparatus within a space by using a prescribed number of combinations that correlate the prescribed number of projection lines to the prescribed number of feature lines, respectively. The prescribed number of projection lines are obtained by projecting the prescribed number of candidate lines from among a plurality of candidate lines included in shape information of an object onto an image of the object captured by the image capturing apparatus. The prescribed number of feature lines are included in a plurality of feature lines detected from the image.

(2) The computer generates a first projection line by projecting a different candidate line different from the prescribed number of candidate lines from among the plurality of candidate lines onto the image using the first position.

(3) The computer selects a feature line that corresponds to the first projection line from among the plurality of feature lines.

(4) The computer estimates a second position of the image capturing apparatus within the space by using a combination that correlates the first projection line to the selected feature line.

(5) The computer generates a second projection line by projecting the different candidate line onto the image using the second position.

(6) The computer determines a third position of the image capturing apparatus within the space according to an indicator of an interval between the position of the second projection line and the position of the different feature line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A illustrates edge lines;

FIG. 6B illustrates correlations between edge lines and contour lines;

FIG. 6C illustrates superimposed display;

FIG. 15 illustrates a calculation method based on the area of a region;

FIG. 17 illustrates results of calculation of an indicator;

DESCRIPTION OF EMBODIMENTS

Figure 1:
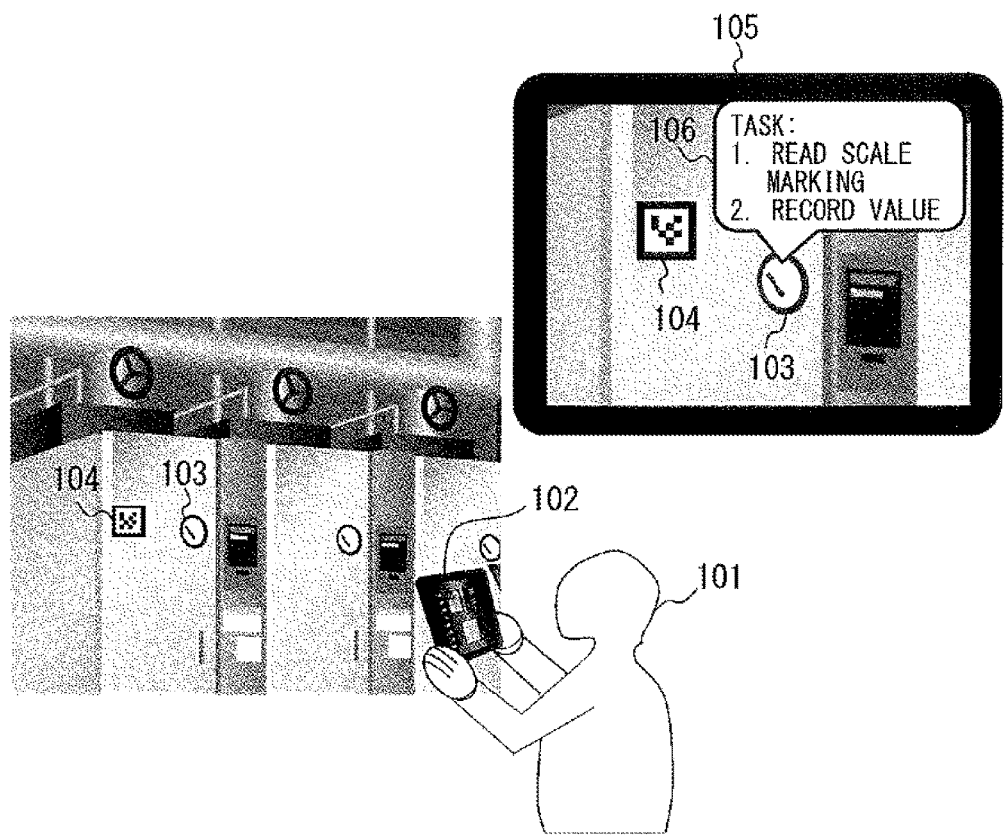
FIG. 1 illustrates an AR technique.

The following describes embodiments in detail by referring to the drawings.

Figure 2:
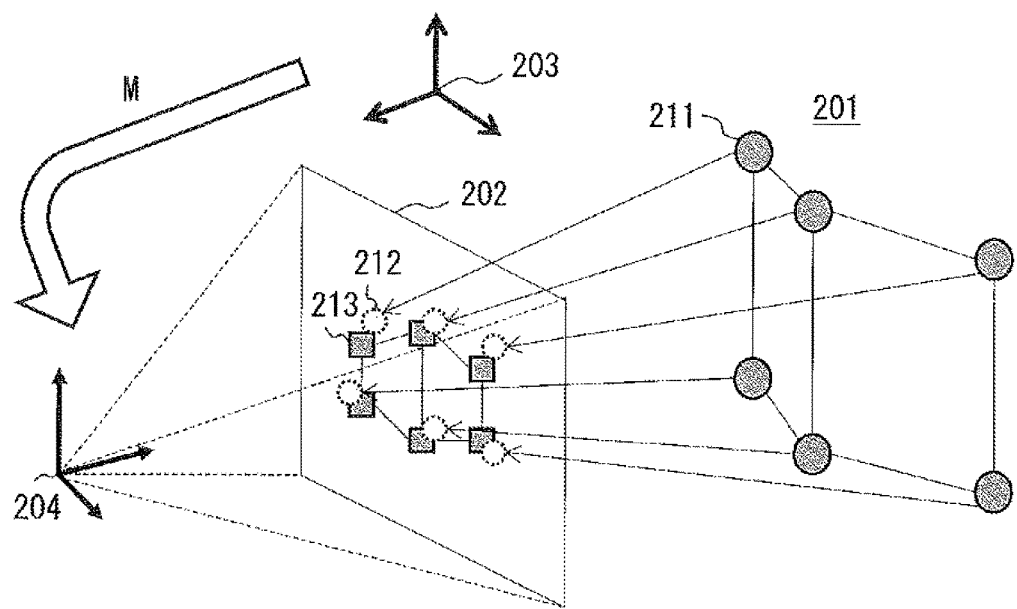
FIG. 2 illustrates a method of determining a camera position and posture.

When CAD data is used as a three-dimensional map 201 in FIG. 2 in determining a camera position and posture, the CAD data and an object often have a difference in "visual" features such as pattern or coloring. When it is presumed that CAD data and an object have a common "visual" feature, it would be difficult to automatically correlate a feature point in an image to a map point represented by the CAD data in image processing. Accordingly, feature points may be manually correlated to map points through mouse operations on a PC screen. In this case, it is considered that the following problems are caused.

(A) It is difficult to accurately detect feature points from an image.

(B) It is difficult to perform operations to select feature points and projection points obtained by projecting map points onto an image using, for example, a mouse.

(C) Because of difficulty to perform an operation of selecting projection points and feature points and troubles with manual tasks, the number of combinations (corresponding pairs) of a projection point and a feature point to be selected is limited.

(D) The number of corresponding pairs is small, thereby decreasing the accuracy of calculation of a camera position and posture.

Another possible method is to correlate edge lines detected from an image to contour lines represented by CAD data, as described in patent document 1 and Japanese Patent Application No. 2015-218318, an earlier application.

Figure 4:
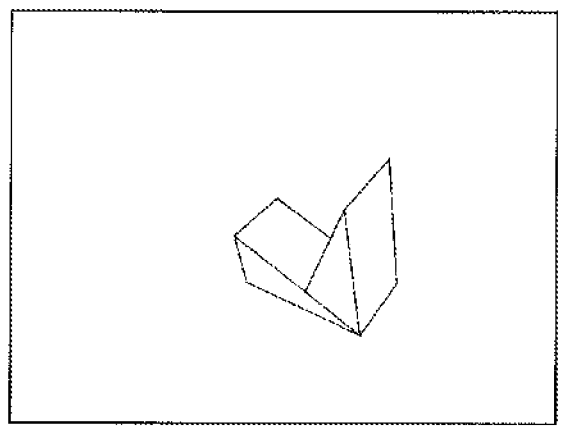
FIG. 4 illustrates an image of an object.
Figure 5:
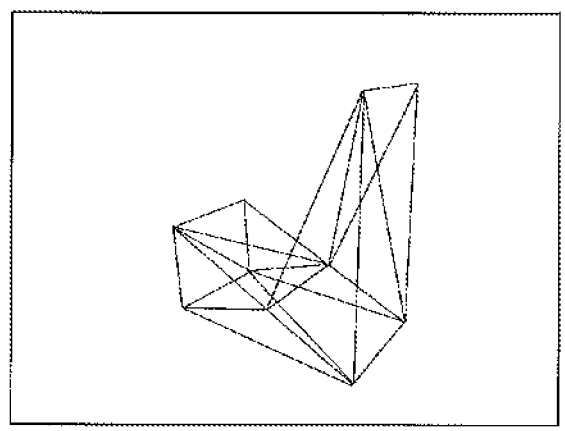
FIG. 5 illustrates CAD data.

FIG. 4 depicts an exemplary image of an object. FIG. 5 depicts an example of CAD data representing the shape of the object in FIG. 4. FIGS. 6A-6C illustrate exemplary correlations between edge lines detected from the image in FIG. 4 and contour lines represented by the CAD data in FIG. 5.

First, an image processing apparatus such as a portable terminal apparatus performs an edge detection process to detect edge lines from an image, as depicted in FIG. 6A. Then, as depicted in FIG. 6B, the image processing apparatus displays contour lines represented by CAD data and the detected edge lines in the image; a user correlates those lines by selecting the edge lines and the contour lines using, for example, a mouse.

Next, the image processing apparatus calculates a camera position and posture using combinations of an edge line and a contour line correlated to each other. As depicted in FIG. 6C, the image processing apparatus superimposes the contour lines represented by the CAD data onto the image of the object in conformity with the calculated camera position and posture.

Such a correlating method allows edge lines to be accurately detected and allows edge lines and contour lines to be readily selected, thereby solving the problems (A) and (B) above. However, it can be considered that the following problems occur.

(E) Troubles with manual tasks limit the number of combinations (corresponding pairs) of a contour line and an edge line to be selected.

(F) The number of corresponding pairs is small, thereby decreasing the accuracy of calculation of a camera position and posture.

Such problems are caused not only when estimating a camera position and posture from CAD data but also when estimating a camera position from another piece of shape information representing the shape of an object.

To determine a camera position and posture, at least four corresponding pairs are desirably used; more corresponding pairs result in a more enhanced accuracy of calculation.

Figure 7:
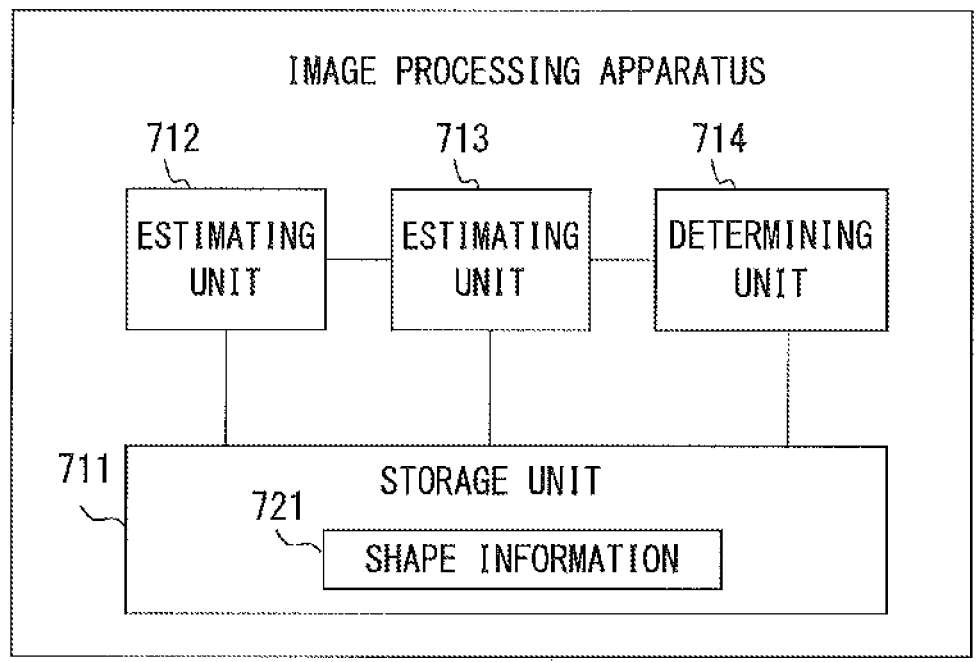
FIG. 7 is a functional configuration diagram of an image processing apparatus.

FIG. 7 is an exemplary functional configuration of an image processing apparatus in accordance with an embodiment. An image processing apparatus 701 in FIG. 7 includes a storage unit 711, an estimating unit 712, an estimating unit 713, and a determining unit 714. The storage unit 711 stores shape information 721 of an object.

Figure 8:
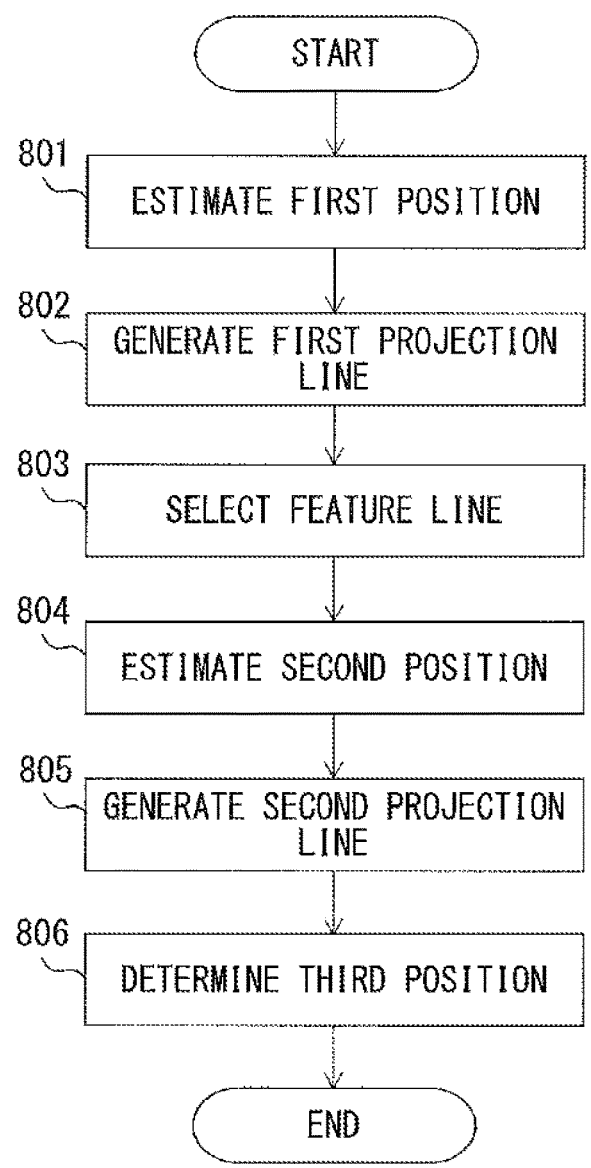
FIG. 8 is a flowchart of image processing.

FIG. 8 is a flowchart illustrating an example of image processing performed by the image processing apparatus 701 in FIG. 7. The estimating unit 712 estimates a first position of an image capturing apparatus within a space using a prescribed number of combinations that correlate the same prescribed number of projection lines to the same prescribed number of feature lines (step 801). The prescribed number of projection lines are obtained by projecting the same prescribed number of candidate lines from among a plurality of candidate lines included in shape information 721 onto an image of an object that has been captured by the image capturing apparatus. The prescribed number of feature lines are included in a plurality of feature lines detected from the image.

The estimating unit 713 generates a first projection line by projecting a candidate line from among the plurality of candidate lines that is different from the prescribed number of candidate lines onto the image using the first position (step 802), and selects a feature line that corresponds to the first projection line from the plurality of feature lines (step 803). The estimating unit 713 estimates a second position of the image capturing apparatus within the space using a combination that correlates the first projection line to the selected feature line (step 804).

The determining unit 714 generates a second projection line by projecting the different candidate line onto the image using the second position (step 805). The determining unit 714 determines a third position of the image capturing apparatus within the space according to an indicator of an interval between the position of the second projection line and the position of the different feature line (step 806).

Such an image processing apparatus 701, is capable of accurately estimating the position of the image capturing apparatus using an image of an object that has been captured by the image capturing apparatus and shape information of the object.

Figure 9:
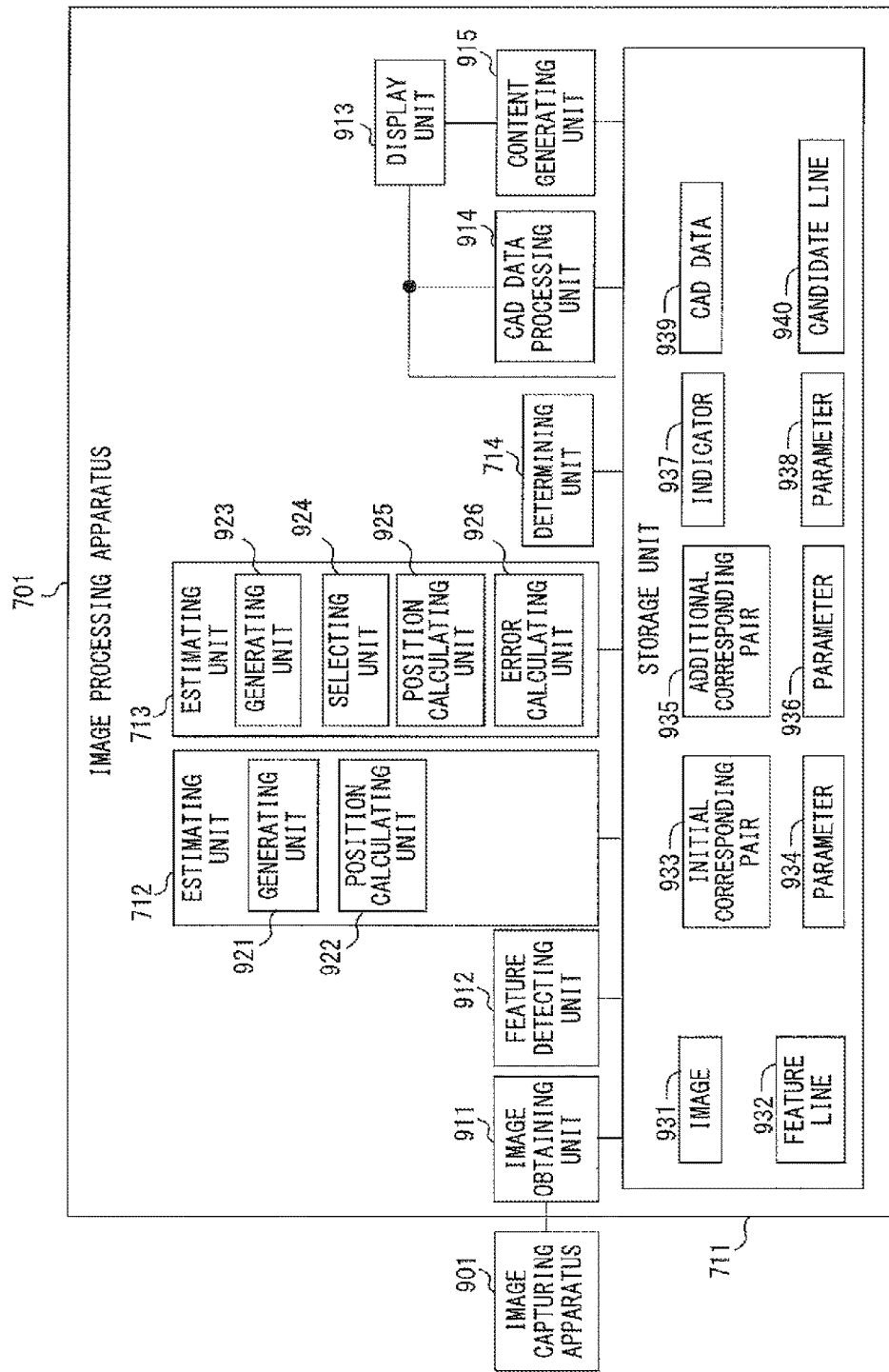
FIG. 9 is a functional configuration diagram illustrating a specific example of an image processing apparatus.

FIG. 9 illustrates a specific example of the image processing apparatus 701 in FIG. 7. The image processing apparatus 701 in FIG. 9 includes a storage unit 711, an estimating unit 712, an estimating unit 713, a determining unit 714, an image obtaining unit 911, a feature detecting unit 912, a CAD data processing unit 914, a content generating unit 915, and a display unit 913. The estimating unit 712 includes a generating unit 921 and a position calculating unit 922. The estimating unit 713 includes a generating unit 923, a selecting unit 924, a position calculating unit 925, and an error calculating unit 926.

The image processing apparatus 701 may be a portable terminal apparatus such as a tablet, a notebook PC, or a smart device, or may be an information processing apparatus such as a desktop PC.

An image capturing apparatus 901 is, for example, a camera, and captures an image 931 of an object. The image obtaining unit 911 obtains the image 931 from the image capturing apparatus 901 and stores the image 931 in the storage unit 711. The storage unit 711 stores the image 931, parameters 934-938, and CAD data 939.

The parameter 934 represents a position and posture of the image capturing apparatus 901 that have been estimated by the estimating unit 712. The parameter 936 represents a position and posture of the image capturing apparatus 901 that have been estimated by the estimating unit 713. The parameter 938 represents a position and posture of the image capturing apparatus 901 that have been determined by the determining unit 714. CAD data 939 corresponds to shape information 721 in FIG. 7 and includes vertex information of a plurality of vertexes representing a three-dimensional shape of an object and line segment information of a plurality of line segments representing the object. The vertex information includes the three-dimensional coordinate of each vertex of the object. The line segment information includes identification information indicating vertexes at the both ends of each line segment.

The feature detecting unit 912 performs an edge detection process to detect a plurality of edge lines from the image 931, and stores the detected edge lines in the storage unit 711 as feature lines 932. The display unit 913 displays the image 931 on a screen and superimposes the feature lines 932 onto corresponding positions in the image 931.

The CAD data processing unit 914 deletes unnecessary line segments from a plurality of line segments included in the CAD data 939 so as to extract line segments representing external-shape features of the object, and stores the extracted line segments in the storage unit 711 as candidate lines 940. The CAD data processing unit 914 generates projection lines by projecting the candidate lines 940 onto the image 931 using initial values for the position and posture of the image capturing apparatus 901. The display unit 913 superimposes the generated projection lines onto the image 931.

A user selects N projection lines (N is an integer that is 2 or greater) from the plurality of projection lines superimposed onto the image 931, and selects, from the plurality of feature lines 932, feature lines to be correlated to the selected individual projection lines. The generating unit 921 of the estimating unit 712 generates N combinations that correlate the projection lines selected by the user to the feature lines selected by the user, and stores the N combinations in the storage unit 711 as N initial corresponding pairs 933. The position calculating unit 922 calculates the position and posture of the image capturing apparatus 901 within the three-dimensional space using the N initial corresponding pairs 933, and stores the calculated position and posture in the storage unit 711 as the parameter 934.

The generating unit 923 of the estimating unit 713 generates projection lines by projecting the candidate lines 940 onto the image 931 using the position and posture of the image capturing apparatus 901 that are represented by the parameter 934, and selects projection lines to be added to the initial corresponding pairs 933 from the generated projection lines. Subsequently, the generating unit 923 selects feature lines to be correlated to the selected projection lines from the plurality of feature lines 932, and generates combinations that correlate the selected projection lines to the selected feature lines. The generating unit 923 stores the generated combinations in the storage unit 711 as additional corresponding pairs 935.

The selecting unit 924 selects N corresponding pairs from the initial corresponding pairs 933 and the additional corresponding pairs 935. The position calculating unit 925 calculates the position and posture of the image capturing apparatus 901 within the three-dimensional space using the N corresponding pairs selected by the selecting unit 924, and stores the calculated position and posture in the storage unit 711 as the parameter 936.

In this case, while changing variables representing the position and posture of the image capturing apparatus 901 on a prescribed-value by prescribed-value basis, the position calculating unit 925 generates a projection line by projecting a candidate line 940 that corresponds to a projection line included in each corresponding pair. The position calculating unit 925 outputs the generated projection line and the feature line included in the corresponding pair to the error calculating unit 926. The error calculating unit 926 calculates and outputs an error representing an interval between the position of the projection line and the position of the feature line to the position calculating unit 925. The position calculating unit 925 calculates, as the parameter 936, values of variables corresponding to a smallest error output by the error calculating unit 926.

While changing the selection of N corresponding pairs, the estimating unit 713 repeats the process of calculating the parameter 936 a plurality of times. Every time the parameter 936 is calculated, the determining unit 714 uses the position and posture of the image capturing apparatus 901 represented by the parameter 936 so as to project a candidate line 940 corresponding to each projection line included in N corresponding pairs selected by the selecting unit 924 onto the image 931. As with the error calculating unit 926, the determining unit 714 calculates a total sum of errors between the positions of the N projection lines and the positions of the N feature lines, and stores the calculated total sum of errors in the storage unit 711 as an indicator 937.

Subsequently, the determining unit 714 determines N corresponding pairs with the smallest total sum of errors according to the indicator 937 calculated using each parameter 936. The determining unit 714 calculates the position and posture of the image capturing apparatus 901 within the three-dimensional space using the determined N corresponding pairs, and stores the calculated position and posture in the storage unit 711 as the parameter 938.

On the basis of the position and posture of the image capturing apparatus 901 represented by the parameter 938, the content generating unit 915 generates a content image representing content information corresponding to the object. The display unit 913 superimposes the content image onto the image 931.

Such an image processing apparatus 701, allows a user to simply select an initial corresponding pair 933 so as to automatically generate an additional corresponding pair 935 of a projection line and a feature line, thereby decreasing the workload on the user. An increase in the number of corresponding pairs enhances the accuracy of estimation of the position and posture of the image capturing apparatus 901 and thus enhances the accuracy of the displaying of a content image, thereby achieving high-quality AR.

Figure 10:
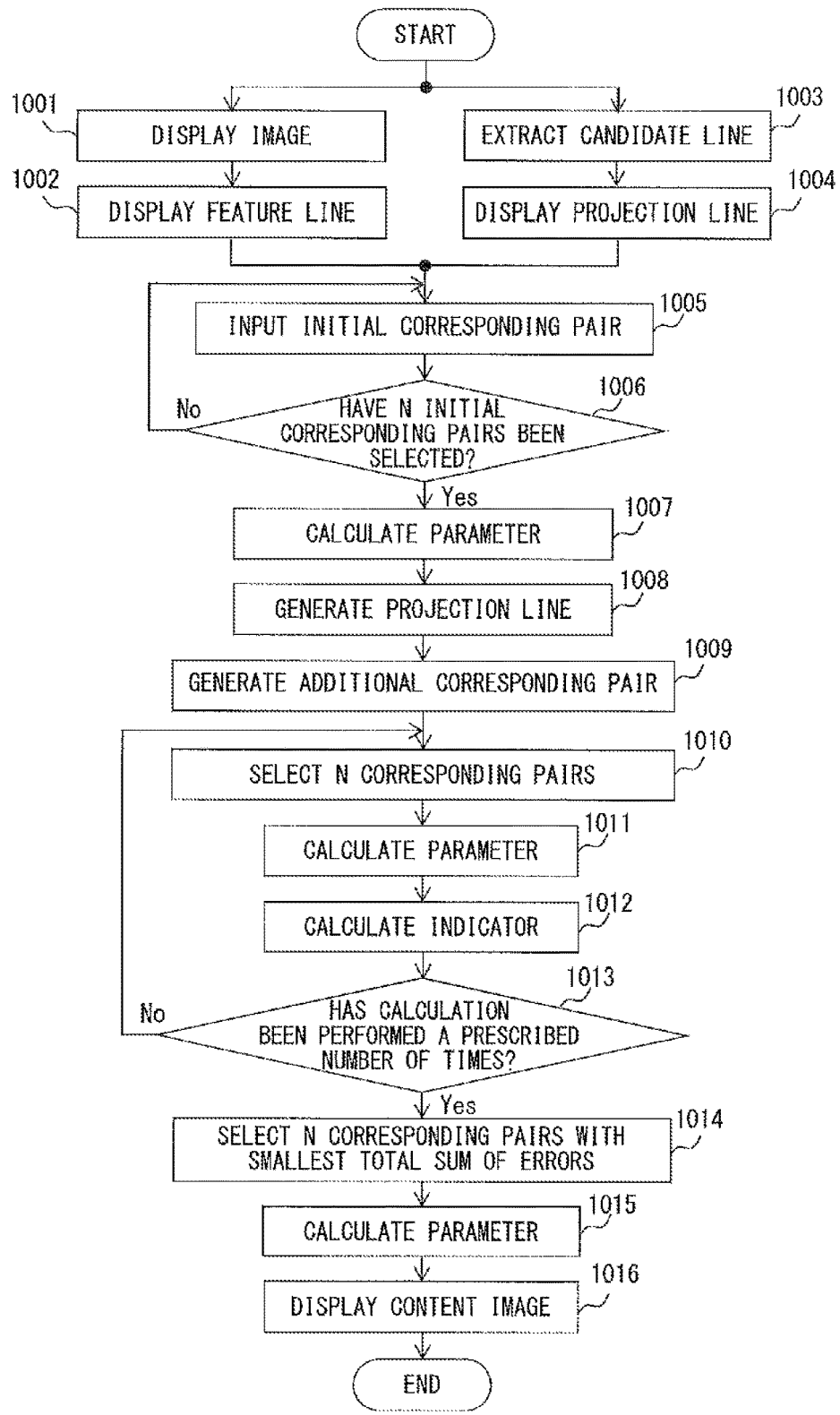
FIG. 10 is a flowchart illustrating a first specific example of image processing.

FIG. 10 is a flowchart illustrating a first specific example of image processing performed by the image processing apparatus 701 in FIG. 9. The image obtaining unit 911 obtains an image 931 from the image capturing apparatus 901, and the display unit 913 displays the image 931 on a screen (step 1001). The feature detecting unit 912 detects a plurality of feature lines 932 from the image 931, and the display unit 913 superimposes the feature lines 932 onto the image 931 (step 1002).

The CAD data processing unit 914 extracts a candidate line 940 from CAD data 939 (step 1003). The CAD data processing unit 914 projects the candidate line 940 onto the image 931, and the display unit 913 superimposes a projection line onto the image 931 (step 1004).

At that moment, the position and posture of the image capturing apparatus 901 as of the capturing of the image 931 have not been estimated yet, and the candidate line 940 is thus projected onto the image 931 using initial values determined in advance for the position and posture of the image capturing apparatus 901. Hence, a corresponding feature line 932 is not highly likely to be located near the projection line. In this situation, if an initial corresponding pair 933 was automatically selected using a certain selection algorithm, an incorrect feature line 932 would be highly likely to be correlated to the projection line.

Accordingly, a minimum number of initial corresponding pairs 933 are selected through the user's visual checking and manual operations. The manual operations include operations that rely on an input device such as a PC mouse, a pen, a keyboard, a smart device, or a touch panel for a smart device or a tablet. Hence, the initial values of the position and posture of the image capturing apparatus 901 are desirably adjusted so that the user's visual checking and manual operations can be readily performed. Owing to the user selecting an initial corresponding pair 933, an incorrect initial corresponding pair 933 becomes unlikely to be generated, thereby enhancing the accuracies of the estimations of the position and posture of the image capturing apparatus 901.

The generating unit 921 receives the input of the initial corresponding pair 933 of the projection line and the feature line 932 that have been selected by the user (step 1005), and checks whether the user has selected N initial corresponding pairs 933 (step 1006). When N initial corresponding pairs 933 have not been selected (No in step 1006), the generating unit 921 repeats the process of step 1005. When N initial corresponding pairs 933 have been selected (Yes in step 1006), the position calculating unit 922 calculates a parameter 934 using those initial corresponding pairs 933 (step 1007).

Figure 11:
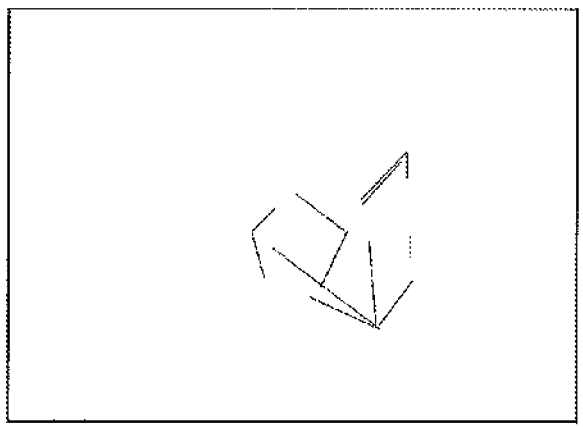
FIG. 11 illustrates feature lines.
Figure 12:
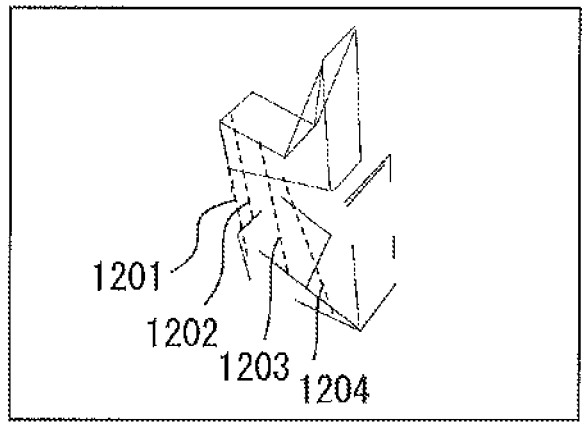
FIG. 12 illustrates initial corresponding pairs.

FIG. 11 illustrates exemplary feature lines 932 detected from the image 931. FIG. 12 illustrates N exemplary initial corresponding pairs 933 selected by the user. In this example, N=4: four initial corresponding pairs 1201-1204 have been selected.

The generating unit 923 generates a projection line by projecting a candidate line 940 onto the image 931 using the parameter 934 (step 1008). The generating unit 923 selects a projection line to be added, and selects a feature line 932 to be correlated to the selected projection line, so as to generate an additional corresponding pair 935 of the projection line and the feature line (step 1009).

Use of only a small number of initial corresponding pairs 933 to calculate the parameter 934 leads to a large estimation error in the parameter 934, and the position of a projection line generated using that parameter 934 could possibly deviate from the position of a feature line that would correspond to the projection line. In the edge detection process, one edge line may be divided into a plurality of edge lines, and an edge line representing a shadow, a flaw, or the like may be detected mistakenly as an edge line representing a feature of an object. Moreover, due to a fault in a manufacturing process, an object shaped differently from CAD data may be produced. For such reasons, a feature line that is the closest to a projection line is not necessarily a corresponding feature line.

Accordingly, the generating unit 923 selects, from a plurality of feature lines 932, one or more feature lines with, for example, at least one of a relative distance or a relative angle satisfying a prescribed condition. The relative distance represents a distance relative to a projection line and the relative angle represents an angle relative to the projection line. Hence, all feature lines located near the projection line and having a direction similar to the direction of the projection line can be selected and correlated to the projection line. For example, the conditions from the following formulae may be used as the prescribed condition.

$$\text{Distance between projection line and feature line} < \text{threshold} \tag{11}$$

$$\text{Angle formed by projection line and feature line} < \text{threshold} \tag{12}$$

Using such conditions allows failure of the obtaining of corresponding pairs that would be caused by various factors to be prevented from occurring. A plurality of feature lines may be correlated to one projection line included in an additional corresponding pair.

Figure 13:
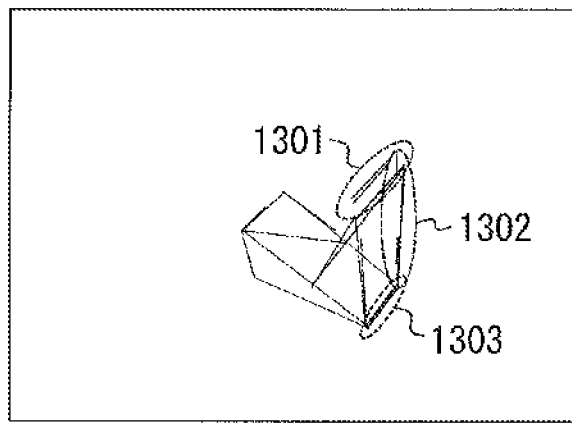
FIG. 13 illustrates additional corresponding pairs.

FIG. 13 illustrates examples of generated additional corresponding pairs 935. In this example, three additional corresponding pairs 1301-1303 have been generated. The additional corresponding pair 1301 includes one projection line and two substantially parallel feature lines.

Figure 14:
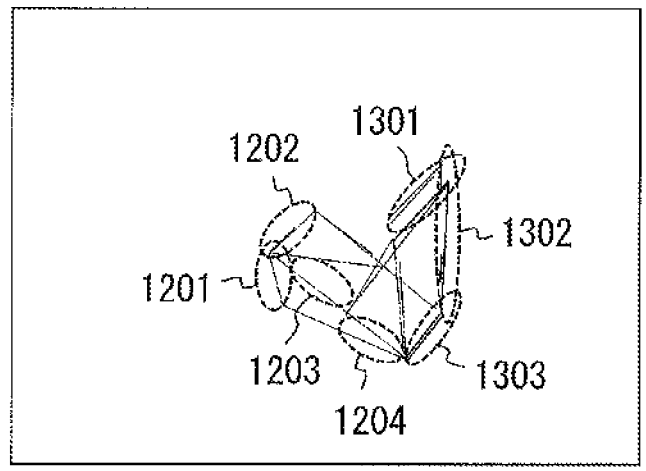
FIG. 14 illustrates initial corresponding pairs and additional corresponding pairs.

FIG. 14 illustrates exemplary initial corresponding pairs 933 and exemplary additional corresponding pairs 935. FIG. 14 illustrates the initial corresponding pairs 1201-1204 depicted in FIG. 12 and the additional corresponding pairs 1301-1303 depicted in FIG. 13.

The selecting unit 924 selects N corresponding pairs from the initial corresponding pairs 933 and the additional corresponding pairs 935 (step 1010). The position calculating unit 925 calculates a parameter 936 using those corresponding pairs (step 1011).

N initial corresponding pairs 933 selected by a user would include substantially no pairs of a projection line and a feature line incorrectly correlated to each other, or would include, if any, about one pair of a projection line and a feature line incorrectly correlated to each other due to an artificial mistake. Feature lines readily selectable through a visual check, i.e., feature lines with a preferable detection result, would tend to be preferentially selected.

Accordingly, the selecting unit 924 desirably incorporates at least one initial corresponding pair 933 into the N corresponding pairs. This enhances the accuracy of calculation of the parameter 936 that represents the position and posture of the image capturing apparatus 901.

It is also desirable that the selecting unit 924 preferentially select, from the initial corresponding pairs 933 and the additional corresponding pairs 935, a corresponding pair that includes a projection line that is longer than those of other corresponding pairs, and incorporate the selected pair into the N corresponding pairs.

A long projection line leads to a long contour line that represents a shape of an object, and hence a longer feature line is likely to be detected. It is also considered that a longer feature line has a higher reliability. In addition, in the calculations of the position and posture of the image capturing apparatus 901, a longer projection line and a longer feature line result in a more enhanced accuracy of calculation of an error between the projection line and the feature line, thereby enhancing the accuracy of the calculation of the parameter 936.

In addition, the selecting unit 924 desirably preferentially selects, from the initial corresponding pairs 933 and the additional corresponding pairs 935, corresponding pairs that include projection lines corresponding to an outer edge of a graphic represented by a plurality of projection lines, and incorporates the selected pairs into the N corresponding pairs. The projection lines corresponding to the outer edge of the graphic represent counter lines of the object, and it is considered that the corresponding feature lines also represent contour lines.

For contour lines, borders between an object and background are detected as feature lines; however, since the object and the background are physically separated, each of the borders is often differently exposed to light from the sun, luminaire, or the like, or has a different material or color. Accordingly, clearer feature lines tend to be detected, thereby enhancing the accuracy of the positions of the feature lines. Selecting many corresponding pairs representing contour lines extends the range of distribution of corresponding pairs within the image 931, and this is thought to contribute to enhancement of the accuracy of calculation of the parameter 936.

Counter lines included in CAD data can be detected using a Boundary-Representations technique for CG. For example, as disclosed in non-patent document 2, data with a structure of Winged-Edge, i.e., a boundary representation, may include information representing counter lines and vertexes and surfaces forming the counter lines, and information representing relationships of connections with other counter lines. According to these pieces of information, it can be determined whether each candidate line 940 extracted from CAD data corresponds to an outer edge.

In step 1011, the position calculating unit 925 may calculate the parameter 936 using, for example, a least squares method. In this case, while changing variables representing the position and posture of the image capturing apparatus 901 on a prescribed-value by prescribed-value basis, the position calculating unit 925 evaluates Ei (i=1 to N), an error between the positions of a projection line and a feature line included in each corresponding pair, and determines, as the parameter 936, a variable such that E, which indicates the total sum of square errors for N corresponding pairs, becomes the smallest. The total sum E is calculated using the following formula.

$$E = \Sigma_{i=1}^{N} (Ei)^2 \tag{21}$$

Figure 16:
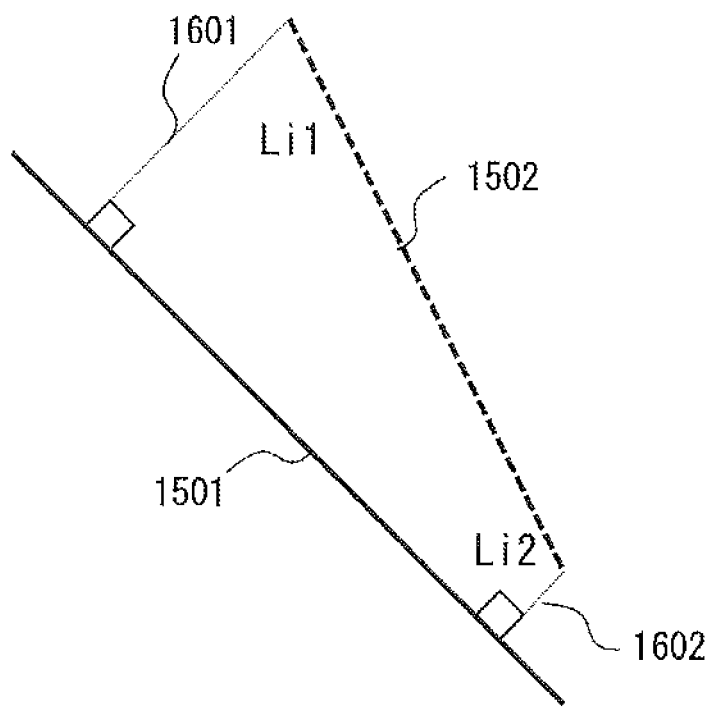
FIG. 16 illustrates a calculation method based on distance.

The error calculating unit 926 may calculate an error Ei using, for example, either of the methods depicted in FIGS. 15 and 16. FIG. 15 illustrates an exemplary calculation method based on the area of a region between a projection line and a feature line. Line segments 1503 and 1504 that link the ends of a line segment 1501 to the ends of a line segment 1502 may be defined, where the line segment 1501 is a projection line included in the i-th corresponding pair, and the line segment 1502 is a feature line included in the i-th corresponding pair. In this case, Ai, which indicates the area of a region 1511 surrounded by the line segments 1501-1504, may be used as the error Ei.

$$Ei=Ai \qquad (22)$$

A smaller area Ai leads to a smaller error Ei, and the error Ei becomes 0 when the line segment 1501 overlaps the line segment 1502.

FIG. 16 illustrates an exemplary calculation method based on a distance between a projection line and a feature line. Let Li1 and Li2 indicate the lengths of perpendicular lines 1601 and 1602 each extending from an end of the line segment 1502 to the line segment 1501. The sum of Li1 and Li2 may be used as the error Ei.

$$Ei=Li1+Li2 \qquad (23)$$

Shorter perpendicular lines Li1 and Li2 lead to a smaller error Ei, and the error Ei becomes 0 when the line segment 1501 overlaps the line segment 1502.

As depicted in FIG. 13, a plurality of feature lines may be correlated to one projection line included in an additional corresponding pair. When, for example, an i-th corresponding pair includes K feature lines, the position calculating unit 925 evaluates an error E (i, j) (j=1 to K) for each feature line and may use the smallest value among E (i, 1) to E(i, K) as Ei.

$$Ei=\min\{E(i,1),E(i,2),\ldots,E(i,K)\} \qquad (24)$$

In this case, the position calculating unit 925 records a feature line corresponding to the smallest value in the storage unit 711 as a representative feature line of the i-th corresponding pair. This allows the determining unit 714 and the content generating unit 915 to perform processing using the representative feature line.

Using the parameter 936, the determining unit 714 calculates an indicator 937 that represents the total sum of errors for N corresponding pairs (step 1012), and checks whether the calculation of the indicator 937 has been performed a prescribed number of times (step 1013). When the calculation of the indicator 937 has not been performed the prescribed number of times (No in step 1013), the selecting unit 924 changes the selection of N corresponding pairs (step 1010), and the image processing apparatus 701 repeats the processes of step 1011 and the following steps.

FIG. 17 illustrates exemplary calculation results from the repeating of the calculation of the indicator 937 R times using the initial corresponding pairs 1201-1204 and the additional corresponding pairs 1301-1303 depicted in FIG. 14.

In this example, N=4; P1 to P4 represent initial corresponding pairs 1201-1204; P5 to P7 represent additional corresponding pairs 1301-1303. The feature lines F1 and F2 represent two substantially parallel feature lines included in the additional corresponding pair 1301. The feature lines F3 and F4 represent two perpendicularly divided feature lines included in the additional corresponding pair 1302. "o" represents a selected corresponding pair.

When the calculation of the indicator 937 has been performed the prescribed number of times (Yes in step 1013), the determining unit 714 selects N corresponding pairs with the smallest total sum of errors (step 1014), and calculates the parameter 938 according to the corresponding pairs (step 1015).

In the calculation results in FIG. 17, the total sum E of square errors in the eighth calculation is 10, which corresponds to the smallest value. Accordingly, the four corresponding pairs with the smallest total sum of errors are P1, P3, P4, and P6. E is the smallest when the feature line F3 is selected from the feature lines F3 to F4 included in the additional corresponding pair P6.

In step 1015, as with the position calculating unit 925, the determining unit 714 may calculate the position and posture of the image capturing apparatus 901 using the N corresponding pairs selected in step 1014.

However, the N corresponding pairs selected in step 1014 alone may be incapable of achieving a small calculation error. Accordingly, the determining unit 714 may recalculate the position and posture of the image capturing apparatus 901 using all corresponding pairs, including the initial corresponding pairs 933 and the additional corresponding pairs 935. In this case, for a corresponding pair that includes a plurality of feature lines, the determining unit 714 selects a representative feature line that corresponds to the smallest error, and calculates the position and posture of the image capturing apparatus 901 using the selected representative feature line.

The determining unit 714 may exclude, from the initial corresponding pairs 933 and the additional corresponding pairs 935, corresponding pairs for which the error calculating unit 926 has calculated an error that is greater than a prescribed value, and may recalculate the position and posture of the image capturing apparatus 901 using the remaining corresponding pairs. This eliminates the influence of corresponding pairs with a large error, thereby enhancing the accuracy of estimation of the position and posture of the image capturing apparatus 901.

In addition, as with the selecting unit 924, the determining unit 714 may preferentially select corresponding pairs that include a projection line longer than those of other corresponding pairs, or corresponding pairs that include projection lines corresponding to an outer edge of the graphic, so as to calculate the position and posture of the image capturing apparatus 901.

In this case, for example, a possible method may be such that the total sum E from formula (21) is calculated through weighted addition so as to assign a lower weight to prescribed corresponding pairs to be preferentially selected than those assigned to other corresponding pairs. Hence, the total sum E achieved when the N corresponding pairs include the prescribed corresponding pairs becomes smaller than the total sum E that is achieved when N corresponding pairs do not include the prescribed corresponding pairs, with the result that the N corresponding pairs that include the prescribed corresponding pairs are preferentially used.

Figure 18:
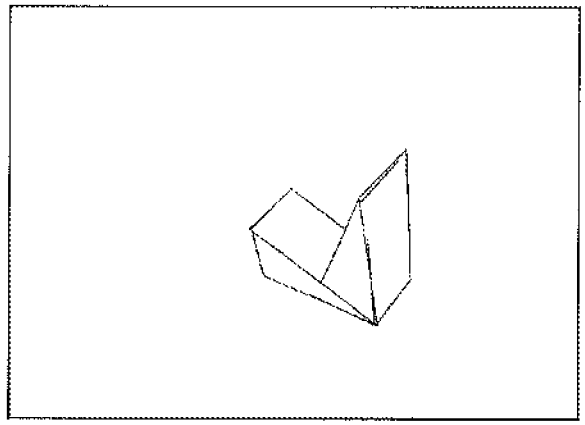
FIG. 18 illustrates projection lines.

FIG. 18 illustrates exemplary projection lines generated by projecting candidate lines 940 onto the image 931 using the parameter 938.

The content generating unit 915 generates a content image using the parameter 938, and the display unit 913 superimposes the content image onto the image 931 (step 1016).

In this case, the display unit 913 may display projection lines and feature lines included in corresponding pairs whose error Ei is greater than a prescribed value on a screen in a display form that is different from the display form for projection lines and feature lines included in corresponding pairs whose error Ei is equal to or less than the prescribed value. In this case, the display unit 913 may change the color, line width, format, or the like of projection lines and feature lines included in the corresponding pairs with a large error Ei, so as to highlight those projection lines and feature lines.

Corresponding pairs with a large error Ei could reflect an object shape that is different from created CA data due to a fault in the manufacturing process. Highlighting such feature lines allows the user to readily visually check the position of the fault so that the product can be readily inspected.

In the image processing in FIG. 10, the calculation of the indicator 937 is repeated while changing the selection of N corresponding pairs so that the parameter 938 can be determined according to N corresponding pairs with the smallest total sum of errors. This enhances the accuracy of estimation of the position and posture of the image capturing apparatus 901 and achieves high-quality AR. Moreover, the AR technique can be applied not only to an application of superimposition of a content image but also to an application such as inspection of a product.

Figure 19:
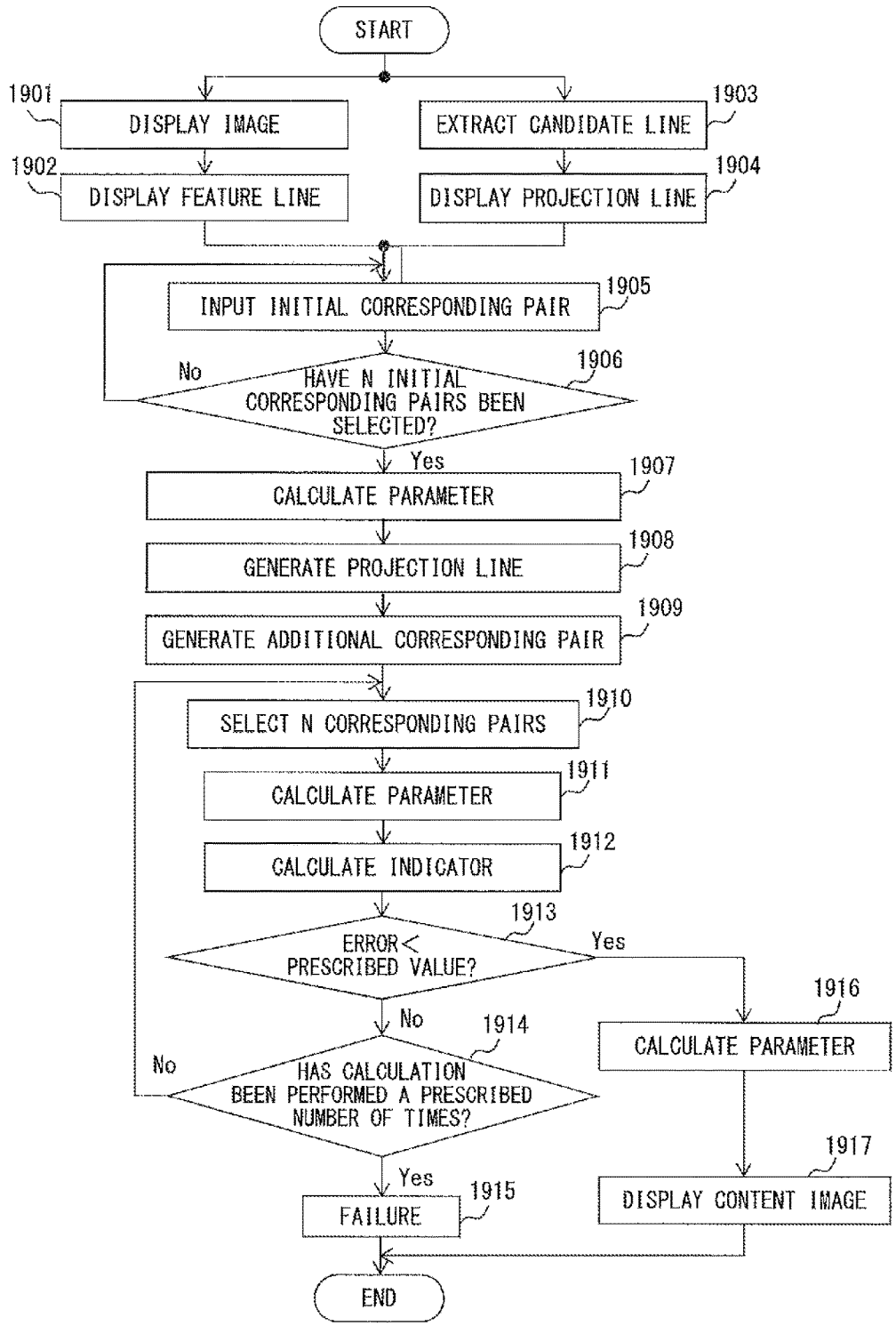
FIG. 19 is a flowchart illustrating a second specific example of image processing.

FIG. 19 is a flowchart illustrating a second specific example of image processing performed by the image processing apparatus 701 in FIG. 9. The processes of steps 1901-1912, 1916, and 1917 are similar to the processes of steps 1001-1012, 1015, and 1016 in FIG. 10.

After calculating the indicator 937, the determining unit 714 compares an error represented by the indicator 937 with a prescribed value (step 1913). When the error is equal to or greater than the prescribed value (No in step 1913), the determining unit 714 checks whether the calculation of the indicator 937 has been performed a prescribed number of times (step 1914). When the calculation of the indicator 937 has not been performed the prescribed number of times (No in step 1914), the selecting unit 924 changes the selection of N corresponding pairs (step 1910), and the image processing apparatus 701 repeats the processes of step 1911 and the following steps.

Meanwhile, when the error is less than the prescribed value (Yes in step 1913), the determining unit 714 performs the processes of step 1916 and the following steps. When the calculation of the indicator 937 has been performed the prescribed number of times (Yes in step 1914), the determining unit 714 determines that the correlating of the image 931 to CAD data 939 has failed (step 1915) and ends the processing.

In the image processing in FIG. 19, at the moment at which the error has become less than the prescribed value, the repetitive processing is terminated to calculate the parameter 938. Hence, the position and posture of the image capturing apparatus 901 can be promptly determined.

The configurations of the image processing apparatus 701 in FIGS. 7 and 9 are merely examples, and some components may be omitted or changed depending on applications or conditions of the image processing apparatus 701. When, for example, the processing of detecting feature lines 932 from the image 931 is performed by an apparatus external to the image processing apparatus 701, the feature detecting unit 912 in FIG. 9 may be omitted.

When an external apparatus performs the process of extracting candidate lines 940 from CAD data 939, the CAD data processing unit 914 may be omitted. When an external apparatus performs the process of superimposing a content image onto the image 931, the display unit 913 and the content generating unit 915 may be omitted. In place of CAD data 939, another piece of shape information representing a shape of an object may be used.

The flowcharts in FIGS. 8, 10, and 19 are merely examples, and some processes may be omitted or changed depending on the configuration or conditions of the image processing apparatus 701. When, for example, an external apparatus performs the process of extracting candidate lines 940 from CAD data 939, the processes of step 1003 in FIG. 10 and step 1903 in FIG. 19 may be omitted. When an external apparatus performs the process of superimposing a content image onto the image 931, the processes of step 1016 in FIG. 10 and step 1917 in FIG. 19 may be omitted.

The number of initial corresponding pairs 933 selected in step 1005 in FIG. 10 may be different from the number of corresponding pairs selected in step 1010. Similarly, the number of initial corresponding pairs 933 selected in step 1905 in FIG. 19 may be different from the number of corresponding pairs selected in step 1910.

When the posture of the image capturing apparatus 901 is determined in advance, the only parameter determined in steps 1007, 1011, and 1015 in FIG. 10 may be the position of the image capturing apparatus 901. Similarly, the only parameter determined in steps 1907, 1911, and 1916 in FIG. 19 may be the position of the image capturing apparatus 901.

Figure 3:
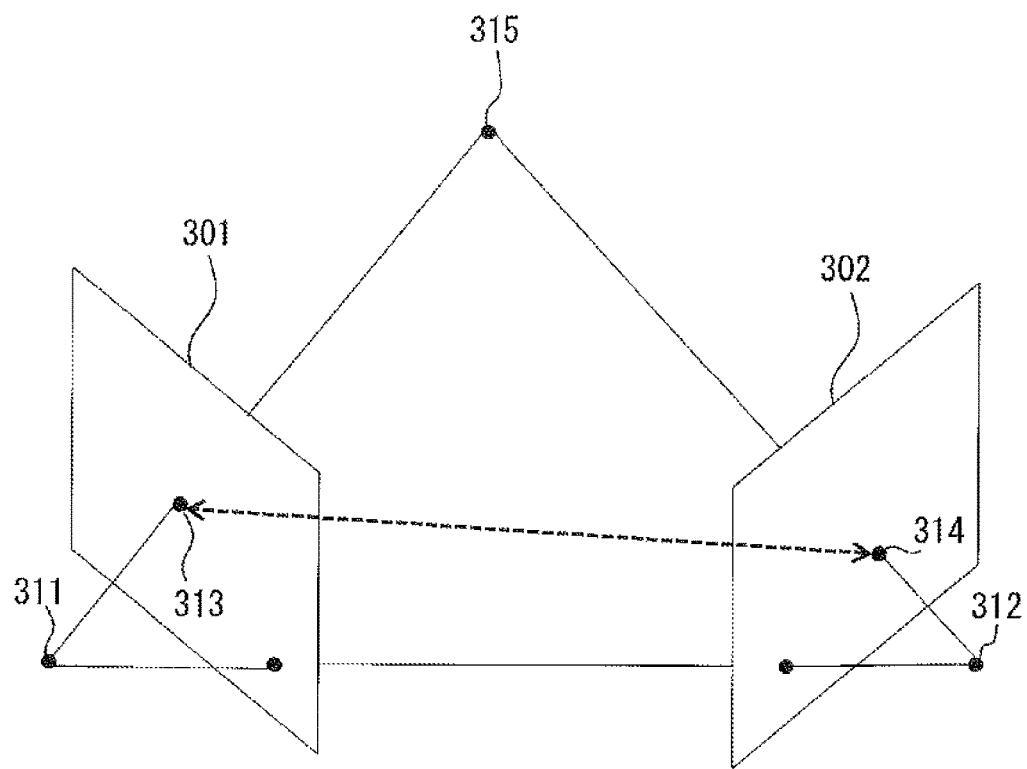
FIG. 3 illustrates a generation method for a three-dimensional map.

The AR technique depicted in FIG. 1 is merely an example, and a displayed image and content information change with a photographed object or applications of the image processing apparatus 701. The three-dimensional map and the image in FIG. 2 are merely examples, and change with a photographed object. The generation method for a three-dimensional map in FIG. 3 is merely an example, and, depending on the configuration or applications of the image processing apparatus 701, another method may be used to generate a three-dimensional map.

The image in FIG. 4, the CAD data in FIG. 5, and the edge lines and contour lines in FIGS. 6A-6C are merely examples; images, CAD data, edge lines, and contour lines change with a photographed object or the configuration or applications of the image processing apparatus 701. The feature lines in FIG. 11, the initial corresponding pairs and the additional corresponding pairs in FIGS. 12-14, the calculation results in FIG. 17, and the projection lines in FIG. 18 are merely examples; feature lines, corresponding pairs, and calculation results change with a photographed object or the configuration or applications of the image processing apparatus 701.

The methods for error calculation in FIGS. 15 and 16 are merely examples; another calculation method may be used in accordance with the configuration or applications of the image processing apparatus 701. Formulae (1)-(24) are merely examples; other formulae may be used in accordance with the configuration or applications of the image processing apparatus 701.

Figure 20:
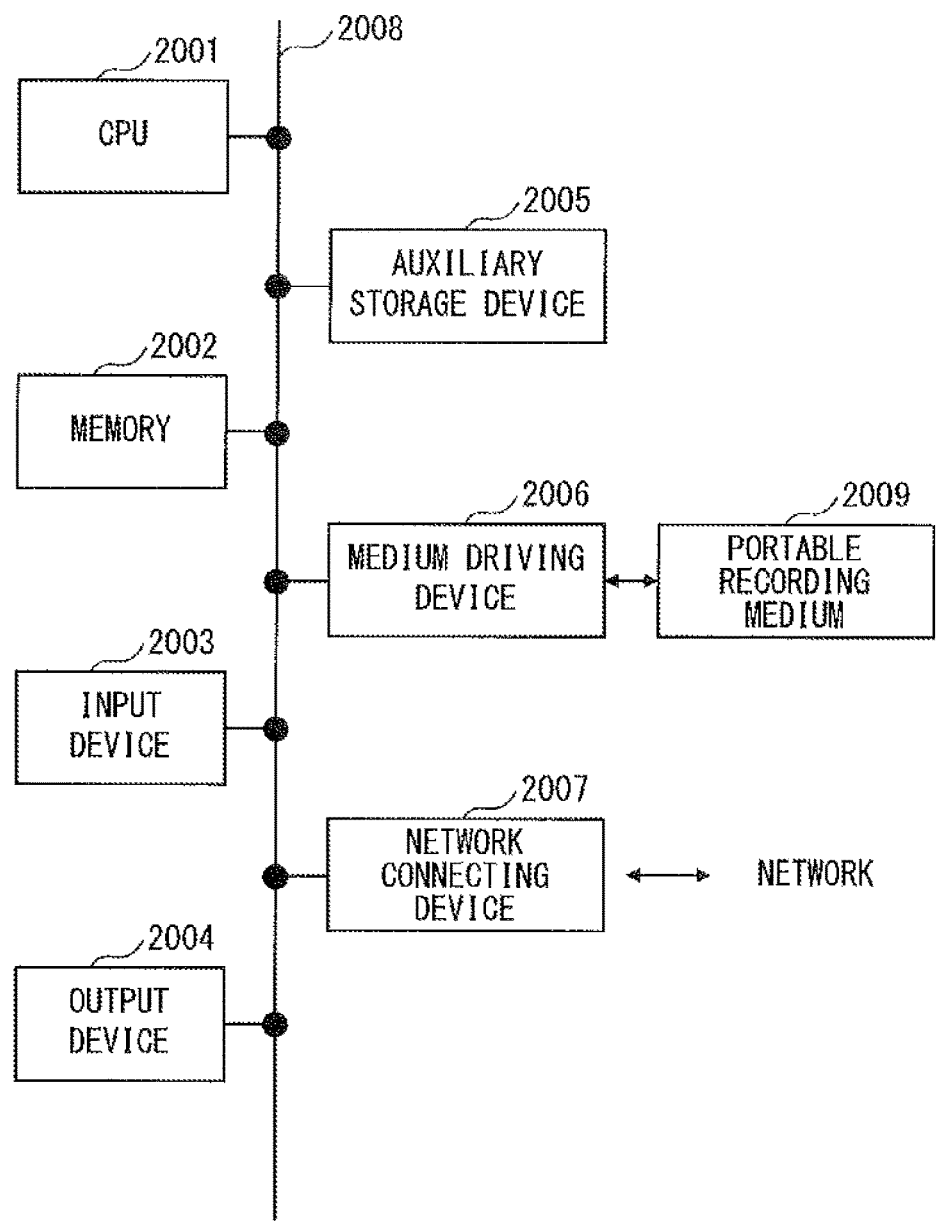
FIG. 20 is a configuration diagram of an information processing apparatus.

The image processing apparatus 701 in FIGS. 7 and 9 may be implemented using, for example, the information processing apparatus (computer) depicted in FIG. 20. The information processing apparatus in FIG. 20 includes a central processing unit (CPU) 2001, a memory 2002, an input device 2003, an output device 2004, an auxiliary storage device 2005, a medium driving device 2006, and a network connecting device 2007. These elements are connected to each other via a bus 2008. The image capturing apparatus 901 in FIG. 9 may be connected to the bus 2008.

The memory 2002 is, for example, a semiconductor memory such as a Read Only Memory (ROM), a Random Access Memory (RAM), or a flash memory, and stores a program and data to be used for image processing. The memory 2002 may be used as the storage unit 711 in FIGS. 7 and 9.

The CPU 2001 (processor) operates as the estimating unit 712, estimating unit 713, and determining unit 714 in FIGS. 7 and 9 by, for example, executing a program using the memory 2002. The CPU 2001 also operates as the feature detecting unit 912, CAD data processing unit 914, content generating unit 915, generating unit 921, position calculating unit 922, generating unit 923, selecting unit 924, position calculating unit 925, and error calculating unit 926 depicted in FIG. 9.

The input device 2003 is, for example, a keyboard or a pointing device and is used to input an instruction or information from an operator or a user. The output device 2004 is, for example, a display device, a printer, or a speaker and is used to output a query or instruction to an operator or a user, and to output processing results. The processing result may be a content image superimposed onto an image, or may be a projection line and a feature line included in a corresponding pair with a large error. The output device 2004 may be used as the display unit 913 in FIG. 9.

The auxiliary storage device 2005 is, for example, a magnetic disk device, an optical disk device, a magneto-optical disk device, or a tape device. The auxiliary storage device 2005 may be a hard disk drive. The information processing apparatus may use a program and data stored in the auxiliary storage device 2005 by loading them into the memory 2002. The auxiliary storage device 2005 may be used as the storage unit 711 in FIGS. 7 and 9.

The medium driving device 2006 drives a portable recording medium 2009 and accesses a recorded item therein. The portable recording medium 2009 is, for example, a memory device, a flexible disk, an optical disk, or a magneto-optical disk. The portable recording medium 2009 may be, for example, a Compact Disk Read Only Memory (CD-ROM), a Digital Versatile Disk (DVD), and a Universal Serial Bus (USB) memory. An operator or a user may store a program and data in the portable recording medium 2009 and may use the program and the data by loading them into the memory 2002.

As described above, a computer-readable recording medium that stores a program and data to be used for image processing is a physical (non-transitory) recording medium such as the memory 2002, the auxiliary storage device 2005, or the portable recording medium 2009.

The network connecting device 2007 is a communication interface that is connected to a communication network such as a Local Area Network or a Wide Area Network and that performs data conversion associated with a communication. The information processing apparatus may receive a program and data from an external device via the network connecting device 2007, and may use the program and data by loading them into the memory 2002.

The information processing apparatus does not need to include all of the elements in FIG. 20, and some of the elements can be omitted depending on applications or conditions. When, for example, the portable recording medium 2009 or the communication network is not used, the medium driving device 2006 or the network connecting device 2007 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an image processing program causing a computer to execute a process comprising:
    estimating a first position of an image capturing apparatus within a space by using a prescribed number of combinations that correlate a prescribed number of projection lines to a prescribed number of feature lines, respectively, wherein the prescribed number of projection lines are obtained by projecting a prescribed number of candidate lines from among a plurality of candidate lines included in shape information of an object onto an image of the object that has been captured by the image capturing apparatus and the prescribed number of feature lines are included in a plurality of feature lines detected from the image;
    generating a first projection line by projecting a different candidate line different from the prescribed number of candidate lines from among the plurality of candidate lines onto the image using the first position;
    selecting a feature line that corresponds to the first projection line from among the plurality of feature lines;
    estimating a second position of the image capturing apparatus within the space by using a combination that correlates the first projection line to a selected feature line that corresponds to the first projection line;
    generating a second projection line by projecting the different candidate line onto the image using the second position; and
    determining a third position of the image capturing apparatus within the space according to an indicator of an interval between a position of the second projection line and a position of the different feature line.

2. The non-transitory computer-readable recording medium according to claim 1, wherein
    the estimating the first position further estimates a first posture of the image capturing apparatus within the space by using the prescribed number of combinations,
    the generating the first projection line generates the first projection line by projecting the different candidate line onto the image using the first position and the first posture,
    the estimating the second position estimates the second position and a second posture of the image capturing apparatus within the space by using the combination that correlates the first projection line to the selected feature line,
    the generating the second projection line generates the second projection line by projecting the different candidate line onto the image using the second position and the second posture, and
    the determining the third position determines the third position and a third posture of the image capturing apparatus within the space according to the indicator.

3. The non-transitory computer-readable recording medium according to claim 1, wherein
    the selecting the feature line selects, from among the plurality of feature lines and as the feature line that corresponds to the first projection line, one or more feature lines with at least one of a relative distance or a relative angle satisfying a prescribed condition, the relative distance representing a distance relative to the first projection line and the relative angle representing an angle relative to the first projection line.

4. The non-transitory computer-readable recording medium according to claim 1, wherein the generating the first projection line generates a plurality of first projection lines that include the first projection line by projecting the plurality of candidate lines onto the image using the first position, the selecting the feature line selects a particular number of first projection lines that include the first projection line from among the plurality of first projection lines, and selects a particular number of feature lines that correspond to the particular number of first projection lines from among the plurality of feature lines, the estimating the second position estimates the second position by using a particular number of combinations that correlate the particular number of first projection lines to the particular number of feature lines, the generating the second projection line generates a particular number of second projection lines that include the second projection line by projecting the particular number of candidate lines onto the image using the second position, and the determining the third position
- determines an indicator of intervals between individual positions of the particular number of second projection lines and individual positions of the particular number of feature lines,
- repeats operations from the selecting the particular number of feature lines to the determining the indicator a plurality of times by changing selection of the particular number of first projection lines, and
- determines the third position according to the particular number of combinations with a smallest total sum of the intervals between the individual positions of the particular number of second projection lines and the individual positions of the particular number of feature lines.

5. The non-transitory computer-readable recording medium according to claim 4, wherein
the selecting the feature line incorporates, into the particular number of first projection lines, a first projection line obtained by projecting at least one of the particular number of candidate lines onto the image using the first position.

6. The non-transitory computer-readable recording medium according to claim 4, wherein
the plurality of first projection lines include one first projection line and other first projection line that is longer than the one first projection line, and
the selecting the feature line preferentially selects the other first projection line as the particular number of first projection lines.

7. The non-transitory computer-readable recording medium according to claim 4, wherein
the selecting the feature line preferentially selects, from among the plurality of first projection lines and as the particular number of first projection lines, a first projection line that corresponds to an outer edge of a graphic represented by the plurality of first projection lines.

8. The non-transitory computer-readable recording medium according to claim 4, wherein
the process further comprises displaying a second projection line and a feature line included in a combination for which the interval is greater than a prescribed value from among the particular number of combinations, on a screen in a display form that is different from a display form for a second projection line and a feature line included in other combination from among the particular number of combinations.

9. An image processing apparatus comprising:
a memory configured to store shape information of an object; and
a processor configured to
estimate a first position of an image capturing apparatus within a space by using a prescribed number of combinations that correlate a prescribed number of projection lines to a prescribed number of feature lines, respectively, wherein the prescribed number of projection lines are obtained by projecting a prescribed number of candidate lines from among a plurality of candidate lines included in the shape information onto an image of the object that has been captured by the image capturing apparatus and the prescribed number of feature lines are included in a plurality of feature lines detected from the image,
generate a first projection line by projecting a different candidate line different from the prescribed number of candidate lines from among the plurality of candidate lines onto the image using the first position,
select a feature line that corresponds to the first projection line from among the plurality of feature lines,
estimate a second position of the image capturing apparatus within the space by using a combination that correlates the first projection line to a selected feature line that corresponds to the first projection line,
generate a second projection line by projecting the different candidate line onto the image using the second position, and
determine a third position of the image capturing apparatus within the space according to an indicator of an interval between a position of the second projection line and a position of the different feature line.

10. The image processing apparatus according to claim 9, wherein
the processor
further estimates a first posture of the image capturing apparatus within the space by using the prescribed number of combinations,
generates the first projection line by projecting the different candidate line onto the image using the first position and the first posture,
estimates the second position and a second posture of the image capturing apparatus within the space by using the combination that correlates the first projection line to the selected feature line,
generates the second projection line by projecting the different candidate line onto the image using the second position and the second posture, and
determines the third position and a third posture of the image capturing apparatus within the space according to the indicator.

11. The image processing apparatus according to claim 9, wherein
the processor selects, from among the plurality of feature lines and as the feature line that corresponds to the first projection line, one or more feature lines with at least one of a relative distance or a relative angle satisfying a prescribed condition, the relative distance representing a distance relative to the first projection line and the relative angle representing an angle relative to the first projection line.

12. An image processing method comprising:
estimating, by a processor, a first position of an image capturing apparatus within a space by using a prescribed number of combinations that correlate a prescribed number of projection lines to a prescribed number of feature lines, respectively, wherein the prescribed number of projection lines are obtained by projecting a prescribed number of candidate lines from among a plurality of candidate lines included in shape information of an object onto an image of the object that has been captured by the image capturing apparatus and the prescribed number of feature lines are included in a plurality of feature lines detected from the image;

generating, by the processor, a first projection line by projecting a different candidate line different from the prescribed number of candidate lines from among the plurality of candidate lines onto the image using the first position;

selecting, by the processor, a feature line that corresponds to the first projection line from among the plurality of feature lines;

estimating, by the processor, a second position of the image capturing apparatus within the space by using a combination that correlates the first projection line to a selected feature line that corresponds to the first projection line;

generating, by the processor, a second projection line by projecting the different candidate line onto the image using the second position; and determining, by the processor, a third position of the image capturing apparatus within the space according to an indicator of an interval between a position of the second projection line and a position of the different feature line.

13. The image processing method according to claim 12, wherein
the estimating the first position further estimates a first posture of the image capturing apparatus within the space by using the prescribed number of combinations,
the generating the first projection line generates the first projection line by projecting the different candidate line onto the image using the first position and the first posture,
the estimating the second position estimates the second position and a second posture of the image capturing apparatus within the space by using the combination that correlates the first projection line to the selected feature line,
the generating the second projection line generates the second projection line by projecting the different candidate line onto the image using the second position and the second posture, and
the determining the third position determines the third position and a third posture of the image capturing apparatus within the space according to the indicator.

14. The image processing method according to claim 12, wherein
the selecting the feature line selects, from among the plurality of feature lines and as the feature line that corresponds to the first projection line, one or more feature lines with at least one of a relative distance or a relative angle satisfying a prescribed condition, the relative distance representing a distance relative to the first projection line and the relative angle representing an angle relative to the first projection line.

* * * * *